G. A. DAVIDSON.
PROCESS FOR SEPARATING MILK AND CHURNING BUTTER.
APPLICATION FILED APR. 8, 1908.

909,763.

Patented Jan. 12, 1909.

ered marked thereon, which form a part
UNITED STATES PATENT OFFICE.

GEORGE A. DAVIDSON, OF DAYTON, OHIO, ASSIGNOR TO ANNA M. DAVIDSON, OF CHICAGO, ILLINOIS.

PROCESS FOR SEPARATING MILK AND CHURNING BUTTER.

No. 909,763.  Specification of Letters Patent.  Patented Jan. 12, 1909.

Application filed April 8, 1908. Serial No. 425,801.

*To all whom it may concern:*

Be it known that I, GEORGE A. DAVIDSON, a citizen of the United States, residing at Dayton, in the county of Montgomery and State of Ohio, have invented certain new and useful Improvements in Processes for Separating Milk and Churning Butter; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a new process for obtaining butter from fresh milk in the shortest possible time. The process through which this result is obtained has the effect of ripening the milk and producing the butter through one operation and substantially simultaneously.

The milk is inclosed in a suitable air tight vessel into which air is forced under the proper pressure into the bottom of the vessel and up through the volume of the milk. The effect of this is to ripen the milk and give it a condition which would require time, and to at the same time so agitate the milk as to form the butter therefrom as soon as it becomes ripened. The air may be passed through a purifying medium before allowed to enter the milk vessel, or it may be forced directly into the milk vessel. In either case, the air must enter the bottom of the milk vessel and be forced through the volume of milk under the requisite pressure with the above result.

In the accompanying drawings, I have illustrated two means for carrying out my improved process.

Figure 1:
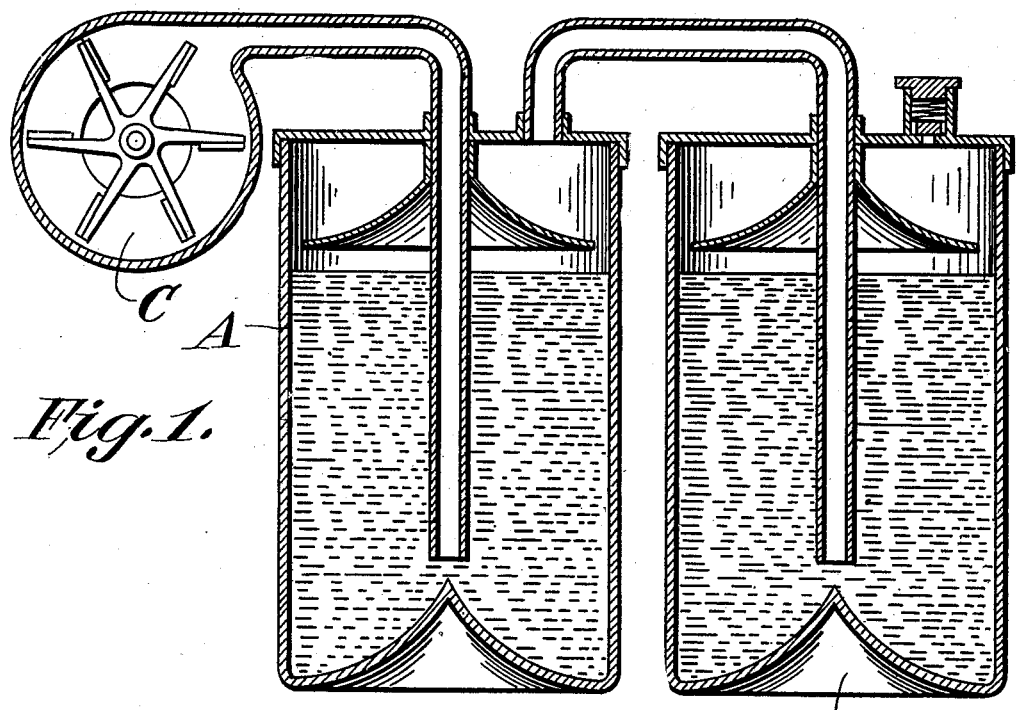
Figure 2:
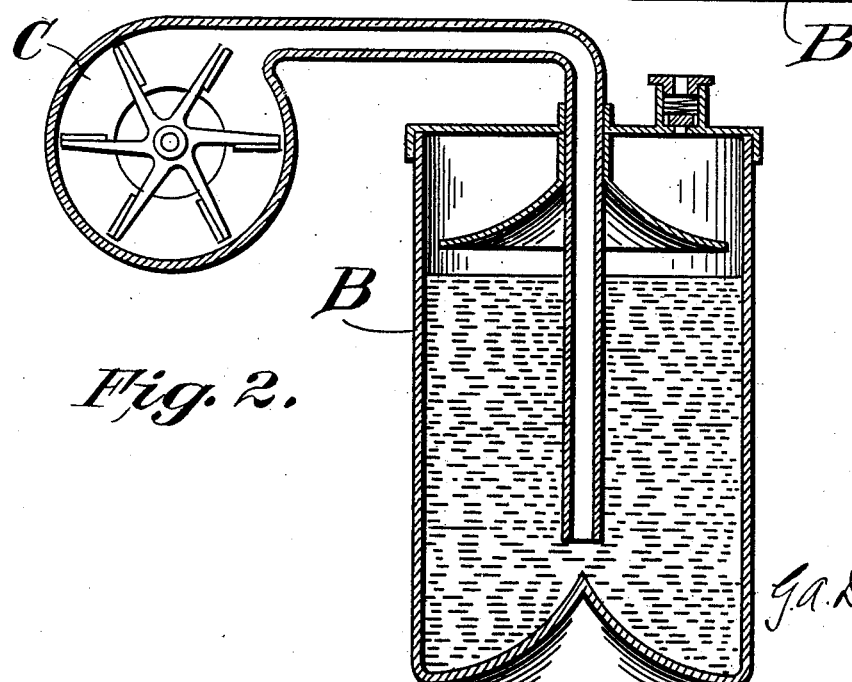

Figure 1 is an apparatus comprising an air generator, C, a purifying medium comprising an air tight vessel A of water through which the air is first forced, and a vessel B containing the milk into which the air is forced after passing through the purifying medium A. Fig. 2, shows the same apparatus minus the air purifying vessel A.

By this process the changing of fresh milk into a ripened or matured condition takes place quickly and the resulting butter is of a superior grade, owing to the fact that the butter globules are not disintegrated or broken during their formation as is the case in the use of a dasher as an agitator. It may be further stated that the agitation given the milk by thus passing air through it under force, ripens the entire body of milk and thus enables the greatest quantity of butter to be obtained therefrom.

Having described my invention, I claim:

The herein-described process of ripening fresh milk and obtaining butter therefrom in the same operation, which consists in placing the milk in an air-tight receptacle before the cream has formed, in forcing air under suitable pressure in a volume into the milk in said receptacle, and in maintaining said air so forced into said milk and receptacle, under compression, whereby the milk is ripened and agitated to form butter.

In testimony whereof I affix my signature, in presence of two witnesses.

GEORGE A. DAVIDSON.

Witnesses:
MATTHEW SIEBLER,
R. J. MCCARTY.